United States Patent
Xiao et al.

(10) Patent No.: US 11,458,449 B2
(45) Date of Patent: Oct. 4, 2022

(54) SUPPORTED METAL HYDROXIDE ADSORBENT FOR ULTRA-DEEP DESULFURIZATION OF GASOLINE AND METHODS FOR ITS PREPARATION AND ITS OXIDATIVE REGENERATION

(71) Applicants: SOUTH CHINA UNIVERSITY OF TECHNOLOGY, Guangdong (CN); DEEP PURE TECHNOLOGIES (SHENZHEN), LTD., Guangdong (CN)

(72) Inventors: Jing Xiao, Guangdong (CN); Cuiting Yang, Guangdong (CN); Lei Dong, Guangdong (CN); Neng Liao, Guangdong (CN); Guang Miao, Guangdong (CN); Zhong Li, Guangdong (CN)

(73) Assignees: SOUTH CHINA UNIVERSITY OF TECHNOLOGY, Guangzhou (CN); DEEP PURE TECHNOLOGIES (SHENZHEN), LTD., Guangdong (CN)

( * ) Notice: Subject to any disclaimer, the term of this patent is extended or adjusted under 35 U.S.C. 154(b) by 183 days.

(21) Appl. No.: 16/920,759

(22) Filed: Jul. 6, 2020

(65) Prior Publication Data
US 2020/0368716 A1    Nov. 26, 2020

Related U.S. Application Data

(63) Continuation of application No. PCT/CN2018/112828, filed on Oct. 30, 2018.

(30) Foreign Application Priority Data

Jan. 4, 2018 (CN) .......................... 201810009078.8
May 23, 2018 (CN) .......................... 201810500570.5

(51) Int. Cl.
| | | |
|---|---|---|
| *B01J 20/04* | (2006.01) | |
| *B01J 20/06* | (2006.01) | |
| *B01J 20/32* | (2006.01) | |
| *B01J 20/34* | (2006.01) | |
| *C10G 25/00* | (2006.01) | |
| *C10G 25/12* | (2006.01) | |

(52) U.S. Cl.
CPC ............. *B01J 20/041* (2013.01); *B01J 20/06* (2013.01); *B01J 20/3236* (2013.01); *B01J 20/3433* (2013.01); *B01J 20/3475* (2013.01); *C10G 25/003* (2013.01); *C10G 25/12* (2013.01); *C10G 2300/104* (2013.01); *C10G 2300/202* (2013.01); *C10G 2400/02* (2013.01)

(58) Field of Classification Search
CPC .......... C10L 2290/54; C10L 2290/542; C10L 2290/546; B01J 20/041; B01J 20/06; B01J 20/3236; B01J 20/3433; B01J 20/3475; C10G 25/003; C10G 25/12; C10G 2400/02; C10G 2300/104; C10G 2300/202; C07C 7/12; C07C 7/13; C07C 17/389

See application file for complete search history.

(56) References Cited

U.S. PATENT DOCUMENTS

| | | | |
|---|---|---|---|
| 5,730,860 A | 3/1998 | Irvine | |
| 5,914,292 A | 6/1999 | Khare et al. | |
| 2005/0150835 A1* | 7/2005 | Vo | B01D 53/64 210/660 |
| 2006/0283780 A1 | 12/2006 | Spivey et al. | |
| 2016/0263549 A1* | 9/2016 | Gaur | B01J 20/20 |

FOREIGN PATENT DOCUMENTS

| | | |
|---|---|---|
| CN | 1193041 | 9/1998 |
| CN | 1594505 | 3/2005 |
| CN | 101134908 | 3/2008 |
| CN | 101314726 | 12/2008 |
| CN | 101524641 | 9/2009 |
| CN | 102773068 | 11/2012 |
| CN | 103977757 | 8/2014 |
| CN | 104667872 | 6/2015 |
| CN | 108187605 | 6/2018 |
| CN | 108704630 | 10/2018 |

OTHER PUBLICATIONS

Machine translation of Bingbing et al (CN1768924), published May 10, 2006.*

* cited by examiner

*Primary Examiner* — Brian A McCaig
(74) *Attorney, Agent, or Firm* — JCIPRNET

(57) ABSTRACT

This invention disclosure reported here a supported metal hydroxide adsorbent and a method for its preparation as well as a method for its oxidative regeneration. The supported metal hydroxide adsorbent comprises metal hydroxide and support with a mass ratio of 5-30:100. The adsorbent disclosed in present invention exhibited outstanding adsorption capacity and high selectivity to sulfur impurity in gasoline. The method of oxidative regeneration provides an efficient way for the recovery of the saturated adsorbent.

12 Claims, No Drawings

SUPPORTED METAL HYDROXIDE ADSORBENT FOR ULTRA-DEEP DESULFURIZATION OF GASOLINE AND METHODS FOR ITS PREPARATION AND ITS OXIDATIVE REGENERATION

CROSS-REFERENCE TO RELATED APPLICATION

This application is a continuation of international PCT application serial no. PCT/CN2018/112828, filed on Oct. 30, 2018, which claims the priority benefit of China application no. 201810009078.8, filed on Jan. 4, 2018, and China application no. 201810500570.5, filed on May 23, 2018. The entirety of each of the above mentioned patent applications is hereby incorporated by reference herein and made a part of this specification.

TECHNICAL FIELD

The present invention relates to the field of gasoline desulfurization, and specifically relates to a supported metal hydroxide adsorbent for ultra-deep desulfurization of gasoline and a method for its preparation.

BACKGROUND

Atmospheric pollutants, e.g. $SO_2$, $NO_x$ and P.M. 2.5, produced by the combustion of sulfur impurities contained gasoline cause serious environment problems and threaten human's health. Accordingly, stringent environmental legislation was developed in many countries to control the concentration of sulfur compounds in gasoline. In 2009, EU released legislation to restrict the sulfur content of gasoline less than 10 ug/g (Euro V). In China, national standard V have been enacted in Jan. 1, 2017, with the requirement of sulfur content in fuel less than 10 ug/g. How to produce ultra-low sulfur contained gasoline has become an important research topic for global petrochemical industrial.

Hydrodesulfurization is the main industry process applied for the removal of sulfur compounds from gasoline via harsh conditions of temperature and pressure. However, it is inefficient and energy-intensive for the elimination of low-concentration sulfur compounds from gasoline. Besides, deep hydrodelsulfurization may lead to the octane number reduction. Adsorptive desulfurization is a process which can realize ultra-deep desulfurization of low sulfur contained gasoline with high selectivity under ambient temperature and pressure, without hydrogen consumption and with low energy consumption, while maintaining the octane number of gasoline. It can be used as a follow-up supplement to hydrodesulfurization technology to achieve efficient ultra-deep gasoline desulfurization.

S-zorb process developed by Phillips Petroleum Company can produce low-sulfur gasoline with the aid of a novel catalyst and small amount of hydrogen (U.S. Pat. No. 5,914,292). $H_2S$ is not liberated during the process, thus avoiding the production of secondary heavy mercaptan which is formed by the recombination reaction between olefin and $H_2S$. Nevertheless, the severe treating conditions and consumption of hydrogen make it a capital-intensive and complex process.

IRVAD technology (U.S. Pat. No. 5,730,860) is a process based on multistage fluidized bed reactor and use of aluminum-based adsorbent for the desulfurization of fuel. The adsorbent employed in this process has relatively low selectivity and limited adsorption capacity for the sulfur compounds. Besides, the regeneration process is relatively complex. Patent CN1594505 reported a metal oxide/$Al_2O_3$ composite adsorbent and used for the adsorptive desulfurization of inferior gasoline under ambient conditions. But the sulfur content in the gasoline is still higher than 100 ug/g after adsorption.

In order to meet the increasingly strict regulation being imposed on the hydrocarbon fuel, it is imperative to develop a simple, high selectivity and low octane number loss method for the desulfurization of gasoline.

SUMMARY OF THE INVENTION

The present invention provides a supported metal hydroxide adsorbent and a method for its preparation as well as a method for its oxidative regeneration.

The specific embodiments of the present invention are listed below:

In accordance with one aspect of the present disclosure, a supported metal hydroxide adsorbent is provided including a metal hydroxide and a support, the metal hydroxide is loaded on the support and a mass ratio of the metal hydroxide to the support is 5:100 to 30:100.

Further, types of metal in the metal hydroxide could be one or more of alkalis metal, alkaline-earth metal, copper, iron, zinc, manganese, aluminum, cerium, cobalt, nickel, chromium, titanium, vanadium, stannum.

Further, the support may be one or more of an organic support and an inorganic support. Optionally, the organic support could be one or more of activated carbon, coke, charcoal and carbon molecular sieve. Optionally, the inorganic support could be one or more of silicon dioxide, silica gel, alumina, clay, aluminium silicate, silica-alumina, titanium oxide, zirconia, zinc aluminate, zinc titanate, zinc silicate, calcium aluminate, calcium silicate, magnesium silicate, magnesium aluminate, magnesium titanate, synthetic zeolite and natural zeolite.

Further, the metal hydroxide could be one or more of zinc hydroxide, copper hydroxide, magnesium hydroxide, calcium hydroxide, cobalt hydroxide and nickel hydroxide.

Further, the metal hydroxide could be a composite of zinc hydroxide and a metal hydroxide A with a mass ratio of (5 to 15):(1 to 5). The metal hydroxide A could be one of copper hydroxide, magnesium hydroxide, calcium hydroxide, cobalt hydroxide and nickel hydroxide.

Or, the metal hydroxide could be a composite of zinc hydroxide, a metal hydroxide A and a metal hydroxide B with a mass ratio of (5 to 15):(1 to 5):(1 to 5). The metal hydroxide A could be one of copper hydroxide, magnesium hydroxide, calcium hydroxide, cobalt hydroxide and nickel hydroxide. The metal hydroxide B could be one of copper hydroxide, magnesium hydroxide, calcium hydroxide, cobalt hydroxide and nickel hydroxide. Notably, the metal hydroxide A is different from the metal hydroxide B.

Or, the metal hydroxide could be a composite of zinc hydroxide, a metal hydroxide A, a metal hydroxide B and a metal hydroxide C with a mass ratio of (5 to 15):(1 to 5):(1 to 5):(1 to 5). The metal hydroxide A could be one of copper hydroxide, magnesium hydroxide, calcium hydroxide, cobalt hydroxide and nickel hydroxide. The metal hydroxide B could be one of copper hydroxide, magnesium hydroxide, calcium hydroxide, cobalt hydroxide and nickel hydroxide. The metal hydroxide C could be one of copper hydroxide, magnesium hydroxide, calcium hydroxide, cobalt hydroxide and nickel hydroxide. Notably, the metal hydroxide A, metal hydroxide B and the metal hydroxide C are different from each other.

In accordance with another aspect of the present disclosure, a method for preparing the supported metal hydroxide adsorbent is provided, including the steps of:

Step 1: after dissolving a metal salt in water, then adding a support thereto and mixing well;

Step 2: adjusting a pH value of a mixture obtained in step 1 with an alkaline solution; and Step 3: filtering a resultant suspension obtained in step 2, and drying a filtered solid at 60-120° C., and obtaining a final product which is the supported metal hydroxide adsorbent for ultra-deep desulfurization of gasoline.

In the above-mentioned method, a mass ratio of the metal salt to the support mentioned in step 1 is 3:100 to 30:100.

In the above-mentioned method, the pH value mentioned in step 2 is 8.5-14.

In the above-mentioned method, the alkaline solution mentioned in step 2 could be one or more of ammonia, sodium hydroxide and calcium hydroxide.

In the above-mentioned method, the drying mentioned in step 3 lasts for 3-7 hours.

In accordance with another aspect of the present disclosure, a method for oxidative regenerating the supported metal hydroxide adsorbent after adsorptive desulfurization of gasoline is provided, including the steps of:

step (1) after the supported metal hydroxide adsorbent reaching adsorption equilibrium in the adsorptive desulfurization of gasoline, separating the supported metal hydroxide adsorbent from gasoline and obtaining the supported metal hydroxide adsorbent loaded with adsorbates; wherein the gasoline contains sulfur compounds;

step (2) immersing and washing the supported metal hydroxide adsorbent loaded with adsorbates in an oxidant-contained regenerant at 20-250° C.; and step (3) drying the supported metal hydroxide adsorbent loaded with adsorbates after the treatment of step 2 at 50-300° C. and obtaining a regenerated supported metal hydroxide adsorbent.

In the above-mentioned method, the supported metal hydroxide adsorbent loaded with adsorbates includes the adsorbates and the supported metal hydroxide adsorbent; the adsorbates include sulfur compounds; a mass ratio of the adsorbates to the supported metal hydroxide adsorbent is 0.0001:1 to 0.05:1.

In the above-mentioned method, the supported metal hydroxide adsorbent includes a metal hydroxide and a support, and a mass ratio of the metal hydroxide to the support is 5:100 to 30:100.

In the above-mentioned method, the sulfur compounds include mercaptan.

In the above-mentioned method, the oxidant could be one or more of hydrogen peroxide, oxygen, organic peroxides, ozone, sodium persulfate, ammonium persulfate and potassium persulfate.

In the above-mentioned method, a mole ratio of the oxidant to the sulfur compounds is 0.5:1 to 50:1.

In the above-mentioned method, the oxidant-contained regenerant could be one or more of C1-C5 small-molecular fatty alcohols, C2-C8 ethers, C3-C5 ketones, C2-C10 esters, C1-C5 halogenated hydrocarbons, C6-C8 aromatic compounds, water, water vapor, C3-C25 aliphatic hydrocarbons, C2-C4 nitriles, C1-C6 amides.

In the above-mentioned method, a mass ratio of the oxidant-contained regenerant to the supported metal hydroxide adsorbent loaded with adsorbates is 1:1 to 100:1.

In the above-mentioned method, temperature of the immersing and washing is 20-150° C.

In the above-mentioned method, temperature of the drying temperature is 50-120° C.

Compared with the prior art, the present invention advantageously provides a supported metal hydroxide adsorbent which can remove mercaptan from gasoline with high adsorption capacity and selectivity without loss of octane number.

The present disclosure also provides a method for oxidative regenerating the saturated supported metal hydroxide adsorbent after gasoline adsorptive desulfurization, which is an efficient and simple way for the complete recovery of adsorbent.

DETAILED DESCRIPTION OF THE INVENTION

The present disclosure provides a supported metal hydroxide adsorbent for the ultra-deep desulfurization of gasoline. The present disclosure also provides a preparation method as well as an oxidative regeneration method for the supported metal hydroxide adsorbent. Each of these embodiments is discussed in detail below. Notably, certain specific examples provided below are for the purpose of illustration and reference only, not intended to be limiting.

Examples of the method for preparing the supported metal hydroxide adsorbents

Note that the supported metal hydroxide adsorbent is denoted as adsorbent below.

EXAMPLE 1

Preparation of a Supported Zinc Hydroxide Adsorbent 0.2441 g of $ZnSO_4.H_2O$ was dissolved in 5 mL of deionized water and stirred the solution until it was clarified. 0.5 g of silicon dioxide was added to the solution and sonicated for 30 min. 5 wt % ammonia water was used as a precipitator and to adjust the pH of the above solution to 10. The mixture was continually stirred for 24 h at room temperature. The resultant suspension was filtered and washed with deionized water. The final product was dried at 60° C. for 6 h. A mass ratio of metal hydroxide to support is 10:100.

EXAMPLE 2

Preparation of a Supported Copper Hydroxide Adsorbent 0.2097 g of $Cu(NO_3)_2.3H_2O$ was dissolved in 10 mL of deionized water and stirred the solution until it was clarified. 0.5 g of calcium silicate was added to the solution and sonicated for 30 min. 5 wt % ammonia water was used as a precipitator and to adjust the pH of the above solution to 10. The mixture was continually stirred for 24 h at room temperature. The resultant suspension was filtered and washed with deionized water. The final product was dried at 100° C. for 6 h. A mass ratio of metal hydroxide to support is 10:100.

EXAMPLE 3

Preparation of a Supported Magnesium Hydroxide Adsorbent 0.2784 g of anhydrous magnesium sulfate was dissolved in 21 mL of deionized water and stirred the solution until it was clarified. 0.5 g of zirconia was added to the solution and sonicated for 30 min. 5 wt % ammonia water was used as a precipitator and to adjust the pH of the above solution to 11.5. The mixture was continually stirred for 24 h at room temperature. The resultant suspension was filtered and washed with deionized water. The final product was dried at 120° C. for 6 h. A mass ratio of metal hydroxide to support is 10:100.

EXAMPLE 4

Preparation of a Supported Calcium Hydroxide Adsorbent 0.1540 g of $CaCl_2$ was dissolved in 5 mL of deionized water and stirred the solution until it was clarified. 0.5 g of magnesium titanate was added to the solution and sonicated for 30 min. 1 mol/L sodium hydroxide was used as a precipitator and to adjust the pH of the above solution to 12. The mixture was continually stirred for 3 h at room temperature. The resultant suspension was filtered and washed with deionized water. The final product was dried at 60° C. for 6 h. A mass ratio of metal hydroxide to support is 10:100.

EXAMPLE 5

Preparation of a Supported Cobalt Hydroxide Adsorbent A 0.2245 g of $CoCl_2.6H_2O$ was dissolved in 30 mL of deionized water and stirred the solution until it was clarified. 0.5 g of aluminium silicate was added to the solution and sonicated for 30 min. 1 mol/L sodium hydroxide was used as a precipitator and to adjust the pH of the above solution to 12. The mixture was continually stirred for 3 h at room temperature. The resultant suspension was filtered and washed with deionized water. The final product was dried at 60° C. for 6 h. A mass ratio of metal hydroxide to support is 10:100.

EXAMPLE 6

Preparation of a Supported Cobalt Hydroxide Adsorbent B 0.0768 g of $CoCl_2.6H_2O$ was dissolved in 3 mL deionized water and stirred the solution until clarified. 0.12 g of diatomite was added to the solution and sonicated for 15 min. 5 wt % ammonia water was added dropwise to adjust the pH of the above solution to 9. The mixture was continually stirred for 3 h at room temperature. The resultant suspension was filtered and washed with deionized water. The final product was dried at 60° C. for 6 h. A mass ratio of metal hydroxide to support is 10:100.

EXAMPLE 7

Preparation of a Supported Nickel Hydroxide Adsorbent 0.0769 g of $NiCl_2.6H_2O$ was dissolved in 18 mL of deionized water and stirred the solution for 10 min. 0.12 g silica-alumina was added to the solution and sonicated for 15 min. 5 wt % ammonia water was added dropwise to adjust the pH of the above solution to 9. The mixture was continually stirred for 3 h at room temperature. The resultant suspension was filtered and washed with deionized water. The final product was dried at 60° C. for 6 h. A mass ratio of metal hydroxide to support is 10:100.

EXAMPLE 8

Preparation of a Supported Zinc Hydroxide/Nickel Hydroxide Adsorbent 0.2441 g of $ZnSO_4.H_2O$ and 0.0769 g of $NiCl_2.6H_2O$ were dissolved in 70 mL of deionized water and stirred for 10 min. 0.63 g of silicon dioxide was added to the solution and sonicated for 30 min. 5 wt % ammonia water was added dropwise to adjust the pH of the above solution to 9.8. The mixture was continually stirred for 3 h at room temperature. The resultant suspension was filtered and washed with deionized water. The final product was dried at 60° C. for 6 h. A mass ratio of metal hydroxide to support is 25:100.

EXAMPLE 9

Preparation of a Supported Zinc Hydroxide/Calcium Hydroxide/Cobalt Hydroxide Adsorbent 0.1221 g of $ZnSO_4.H_2O$, 0.077 g of $CaCl_2$ and 0.0384 g of $CoCl_2.6H_2O$ were dissolved in 60 mL of deionized water. 0.56 g of silicon dioxide was added to the solution and sonicated for 30 min. 5 wt % ammonia water was added dropwise to adjust the pH of the above solution to 10. The mixture was continually stirred for 24 h at room temperature. The resultant suspension was filtered and washed with deionized water. The final product was dried at 60° C. for 6 h. A mass ratio of metal hydroxide to support is 28:100.

EXAMPLE 10

Preparation of a Supported Copper Hydroxide/Magnesium Hydroxide/Calcium Hydroxide/Cobalt Hydroxide Adsorbent 0.1048 g of $Cu(NO_3)_2.3H_2O$, 0.0643 g of anhydrous magnesium sulfate, 0.077g of $CaCl_2$ and 0.0559 g of $CoCl_2.6H_2O$ were dissolved in 78 mL of deionized water. 0.75 g of calcium silicate was added to the solution and sonicated for 30 min. 5 wt % ammonia water was added dropwise to adjust the pH of the above solution to 10. The mixture was continually stirred for 24 h at room temperature. The resultant suspension was filtered and washed with deionized water. The final product was dried at 100° C. for 6 h. A mass ratio of metal hydroxide to support is 27:100.

COMPARATIVE EXAMPLES

Comparative Example 1 Preparation of a Supported Zinc Hydroxide Adsorbent D1

The synthesis conditions of adsorbent D1 is similar to that of the Example 1, except the pH of the solution was 7.5.

Comparative Example 2 Preparation of a Supported Zinc Hydroxide Adsorbent D2

The synthesis conditions of adsorbent D2 is similar to that of the Example 1, except the drying temperature was 300° C.

Examples of ADS Performance of the Adsorbents from Model Gasoline

Adsorption desulfurization experiments were carried out in a batch reactor setup under ambient conditions. Adsorbent was mixed with model fuel in a given ratio in the reactor. The fuel-to-adsorbent (w/w) was 20. After reaching adsorption equilibrium within 2 h, the treated fuel was sampled and analyzed by an ultraviolet fluorescence sulfur analyzer. The model gasoline consists of C5-C12 hydrocarbon and mercaptan. The adsorptive desulfurization performance of different adsorbents from model gasoline was shown in Table 1. Adsorption capacity of olefin over different adsorbents from gasoline was also studied and the results were shown in Table 2. Note that the abbreviation "10% $Ca(OH)_2$/silicon dioxide" shown in Table 1 and Table 2 represents that the supported calcium hydroxide adsorbent whose support is silicon dioxide, and the mass ratio of calcium hydroxide to silicon dioxide is 10:100. All adsorbents follow this naming convention.

TABLE 1

Desulfurization capacity of various adsorbents from model gasoline

| Number | Adsorbent | Initial concentration of S in model gasoline (ppm) | Adsorption capacity (mg-S/g-cat.) |
|---|---|---|---|
| 1 | 10% $Zn(OH)_2$/silicon dioxide | 500 | 7.25 |
| 2 | 10% $Fe(OH)_x$/silicon dioxide | 500 | 1.47 |
| 3 | 10% $Cu(OH)_2$/silicon dioxide | 500 | 3.17 |
| 4 | 10% $Mn(OH)_x$/silicon dioxide | 500 | 1.87 |
| 5 | 10% $Ca(OH)_2$/silicon dioxide | 500 | 1.16 |
| 6 | 10% $Ni(OH)_2$/silicon dioxide | 500 | 2.17 |
| 7 | 10% $Co(OH)_x$/silicon dioxide | 500 | 1.19 |
| 8 | 10% $Zn(OH)_2$/silicon dioxide | 2500 | 24.04 |
| 9 | 10% $Zn(OH)_2$/silicon dioxide | 5000 | 24.58 |
| 10 | 5% $Zn(OH)_2$/silicon dioxide | 500 | 6.56 |
| 11 | 3% $Zn(OH)_2$/silicon dioxide | 500 | 3.25 |
| 12 | 1% $Zn(OH)_2$/silicon dioxide | 500 | 1.12 |
| 13 | 15% $Zn(OH)_2$/silicon dioxide | 500 | 8.36 |
| 14 | 20% $Zn(OH)_2$/silicon dioxide | 500 | 8.38 |
| 15 | 20% $Zn(OH)_2$/diatomite | 500 | 7.84 |
| 16 | 20% $Zn(OH)_2$/magnesium oxide | 500 | 6.35 |
| 17 | 20% $Zn(OH)_2$/aluminium silicate | 500 | 7.29 |
| 18 | 25% $Zn(OH)_2$/$Ni(OH)_2$/silicon dioxide | 500 | 8.54 |
| 19 | 28% $Zn(OH)_2$/$Ca(OH)_2$/$Co(OH)_x$/silicon dioxide | 500 | 9.12 |
| 20 | 27% $Cu(OH)_2$/$Mg(OH)_2$/$Ca(OH)_2$/$Co(OH)_x$/silicon dioxide | 500 | 8.25 |
| 21 | CoPcS/C | 500 | 0.012 |
| 22 | 10% Cu/silicon dioxide | 500 | 0.51 |
| 23 | 10% Mn/silicon dioxide | 500 | 0.31 |
| 24 | 10% Zn/silicon dioxide | 500 | 0.61 |
| 25 | silicon dioxide | 500 | 0.061 |
| 26 | SY-15 | 500 | 0.087 |
| 27 | ZSM | 500 | 0.001 |
| 28 | 10% CuO/silicon dioxide | 500 | 1.12 |
| 29 | 10% $MnO_x$/silicon dioxide | 500 | 1.15 |
| 30 | 10% ZnO/silicon dioxide | 500 | 2.14 |
| 31 | Adsorbent D1 | 500 | 4.21 |
| 32 | Adsorbent D2 | 500 | 2.52 |

TABLE 2

Adsorption performance of olefin over various adsorbents from model gasoline

| Number | Adsorbent | Adsorption capacity (%) |
|---|---|---|
| 1 | 10% $Ca(OH)_2$/silicon dioxide | 10.98 |
| 2 | 10% $Co(OH)_x$/silicon dioxide | 0 |
| 3 | 10% $Cu(OH)_2$/silicon dioxide | 0 |
| 4 | 10% $Fe(OH)_x$/silicon dioxide | 3.32 |
| 5 | 10% $Mg(OH)_2$/silicon dioxide | 0 |
| 6 | 10% $Mn(OH)_x$/silicon dioxide | 26.26 |
| 7 | 10% $Ni(OH)_2$/silicon dioxide | 11.83 |
| 8 | 10% $Zn(OH)_2$/silicon dioxide | 0 |
| 9 | 10% $Zn(OH)_2$/diatomite | 1.54 |
| 10 | 10% $Zn(OH)_2$/aluminium silicate | 2.12 |
| 11 | 25% $Zn(OH)_2$/$Ni(OH)_2$/silicon dioxide | 0 |
| 12 | 28% $Zn(OH)_2$/$Ca(OH)_2$/$Co(OH)_x$/silicon dioxide | 0 |
| 13 | 27% $Cu(OH)_2$/$Mg(OH)_2$/$Ca(OH)_2$/$Co(OH)_x$/silicon dioxide | 0 |
| 14 | CoPcS/C | 58 |
| 15 | 10% Cu/silicon dioxide | 49 |

As shown in Table 1, the supported hydroxide adsorbent disclosed in the present invention exhibited pronounced adsorption capacities for the sulfur species in model gasoline. The performance of number 1-20 is better than that of numbered 19-30. It is worth to noting that number 13, 14 and 18-20 displayed significant adsorption capacity, confirming the effectiveness of these adsorbents on the removal of mercaptan from gasoline. On the contrary, the S-uptake of adsorbents D1 and D2 are relatively low, suggesting that the synthesis conditions have great impact on the desulfurization performance.

TABLE 2-continued

Adsorption performance of olefin over various adsorbents from model gasoline

| Number | Adsorbent | Adsorption capacity (%) |
|---|---|---|
| 16 | 10% Mn/silicon dioxide | 53 |
| 17 | 10% Zn/silicon dioxide | 53 |
| 18 | silicon dioxide | 54 |
| 19 | SY-15 | 55 |
| 20 | ZSM | 38 |
| 21 | 10% CuO/silicon dioxide | 64 |
| 22 | 10% MnO$_x$/silicon dioxide | 62 |
| 23 | 10% ZnO/silicon dioxide | 67 |
| 24 | Adsorbent D1 | 47 |
| 25 | Adsorbent D2 | 56 |

Table 2 summarized the adsorption results of olefin over different adsorbents. Overall, the adsorption percentage of number 1-13 is much lower than that of the number 14-25. Above all, number 2, 3, 5, 8, 11-13 displayed a zero adsorption capacity for olefin, implying that these adsorbents did not adsorb olefin and had negligible influence on the octane number of gasoline. It is worth noting that the adsorption capacity of olefin over number 21, 22, 23 were relatively high, compared with the supported metal hydroxide adsorbent disclosed by the present invention. According to the above results, the supported zinc hydroxide disclosed by the present invention is a potential adsorbent which can remove the sulfur species with high adsorption capacity and selectivity while minimize the loss of octane number. Adsorbents D1 and D2 showed significant adsorption capacity for olefin, suggesting that the synthesis conditions have great impact on the desulfurization performance.

Example of Adsorptive Desulfurization Performance of the Adsorbents from Gasoline Adsorption desulfurization experiments were carried out in a batch reactor setup under ambient conditions. Adsorbent was mixed with gasoline in a given ratio in the reactor. The fuel-to-adsorbent (w/w) was 20. After reaching adsorption equilibrium within 2.5 h, the treated fuel was sampled and analyzed by an ultraviolet fluorescence sulfur analyzer. The initial concentration of sulfur species in gasoline was 327 ppm. The adsorptive desulfurization performance of different adsorbents from gasoline was shown in Table 3. Adsorption capacity of olefin over different adsorbents from gasoline was also studied and the results were shown in Table 4. The abbreviation "10% Ca(OH)$_2$/silicon dioxide" shown in Table 3 and Table 4 represents the supported calcium hydroxide adsorbent whose support is silicon dioxide, and the mass ratio of calcium hydroxide to silicon dioxide is 10:100. All adsorbents follow this naming convention.

TABLE 3

Desulfurization capacity of various adsorbents from gasoline

| Number | Adsorbent | Adsorption capacity (mg-S/g-cat.) |
|---|---|---|
| 1 | 10% Zn(OH)$_2$/silicon dioxide | 6.25 |
| 2 | 10% Fe(OH)$_x$/silicon dioxide | 1.07 |
| 3 | 10% Cu(OH)$_2$/silicon dioxide | 2.17 |
| 4 | 10% Mn(OH)$_x$/silicon dioxide | 1.27 |
| 5 | 10% Ca(OH)$_2$/silicon dioxide | 1.06 |
| 6 | 10% Ni(OH)$_2$/silicon dioxide | 1.37 |
| 7 | 10% Co(OH)$_x$/silicon dioxide | 0.89 |
| 8 | 5% Zn(OH)$_2$/silicon dioxide | 4.56 |
| 9 | 3% Zn(OH)$_2$/silicon dioxide | 1.02 |
| 10 | 1% Zn(OH)$_2$/silicon dioxide | 0.03 |
| 11 | 15% Zn(OH)$_2$/silicon dioxide | 7.26 |
| 12 | 20% Zn(OH)$_2$/silicon dioxide | 8.02 |
| 13 | 20% Zn(OH)$_2$/diatomite | 6.82 |
| 14 | 20% Zn(OH)$_2$/magnesium oxide | 5.33 |
| 15 | 20% Zn(OH)$_2$/aluminium silicate | 6.09 |
| 16 | 25% Zn(OH)$_2$/Ni(OH)$_2$/silicon dioxide | 7.57 |
| 17 | 28% Zn(OH)$_2$/Ca(OH)$_2$/Co(OH)$_x$/silicon dioxide | 8.18 |
| 18 | 27% Cu(OH)$_2$/Mg(OH)$_2$/Ca(OH)$_2$/Co(OH)$_x$/silicon dioxide | 7.15 |
| 19 | CoPcS/C | 0.021 |
| 20 | 10% Cu/silicon dioxide | 0.41 |
| 21 | 10% Mn/silicon dioxide | 0.21 |
| 22 | 10% Zn/silicon dioxide | 0.42 |
| 23 | silicon dioxide | 0.048 |
| 24 | SY-15 | 0.057 |
| 25 | ZSM | 0.001 |
| 26 | 10% CuO/silicon dioxide | 1.01 |
| 27 | 10% MnO$_x$/silicon dioxide | 0.95 |
| 28 | 10% ZnO/silicon dioxide | 2.03 |
| 29 | Adsorbent D1 | 3.65 |
| 30 | Adsorbent D2 | 1.89 |

TABLE 4

Adsorption performance of olefin over various adsorbents from gasoline

| Number | Adsorbent | Adsorption capacity (%) |
|---|---|---|
| 1 | 10% Ca(OH)$_2$/silicon dioxide | 10.21 |
| 2 | 10% Co(OH)$_x$/silicon dioxide | 0 |
| 3 | 10% Cu(OH)$_2$/silicon dioxide | 0 |
| 4 | 10% Fe(OH)$_x$/silicon dioxide | 2.95 |
| 5 | 10% Mg(OH)$_2$/silicon dioxide | 0 |
| 6 | 10% Mn(OH)$_x$/silicon dioxide | 23.12 |
| 7 | 10% Ni(OH)$_2$/silicon dioxide | 9.17 |
| 8 | 10% Zn(OH)$_2$/silicon dioxide | 0 |
| 9 | 25% Zn(OH)2/Ni(OH)2/silicon dioxide | 0 |
| 10 | 28% Zn(OH)2/Ca(OH)2/Co(OH)X/silicon dioxide | 0 |
| 11 | 27% Cu(OH)2/Mg(OH)2/Ca(OH)2/Co(OH)X/silicon dioxide | 0 |
| 12 | CoPcS/C | 60 |
| 13 | 10% Cu/silicon dioxide | 45 |
| 14 | 10% Mn/silicon dioxide | 58 |
| 15 | 10% Zn/silicon dioxide | 61 |
| 16 | silicon dioxide | 51 |
| 17 | SY-15 | 49 |
| 18 | ZSM | 58 |
| 19 | 10% CuO/silicon dioxide | 65 |
| 20 | 10% MnO$_x$/silicon dioxide | 62 |
| 21 | 10% ZnO/silicon dioxide | 61 |
| 22 | Adsorbent D1 | 39 |
| 23 | Adsorbent D2 | 52 |

As can be seen from Table 3 and Table 4, the supported metal hydroxide adsorbents provided by the present disclosure demonstrated superior performance for the elimination of mercaptan with minor loss of octane number. To study the adsorbed sulfur species over adsorbents, the surface adsorbed sulfur species loaded on 10% Zn(OH)$_2$/silicon dioxide and 10% ZnO/silicon dioxide displayed in number 1 and number 28 shown in Table 3 were dissolved and detected. Mercaptan was observed in the dissolved sample of number 1 while no mercaptan was detected in the dissolved sample of number 28, indicating the high adsorption selectivity of 10% Zn(OH)$_2$/silicon dioxide for mercaptan.

Embodiment of a method for oxidative regenerating the supported metal hydroxide adsorbent after gasoline adsorptive desulfurization is provided, including the steps of step S100, S200 and S300, as shown below:

Step S100: after the adsorbent reaching adsorption equilibrium in the adsorptive desulfurization of gasoline, separating the saturated adsorbent from gasoline and obtaining an adsorbent loaded with adsorbates. The gasoline contains sulfur compounds. The separation methods include but are not limited to gas purge, filtration, centrifugal filtration.

Step S200: immersing and washing the saturated adsorbent in an oxidant-contained regenerant at 20-250° C. The oxidant-contained regenerant can oxidize and elute the surface adsorbates of the saturated adsorbent without affecting the desulfurization performance. Additionally, within the range of regeneration temperature mentioned above, the valid performance of the adsorbent can be ensured. Preferably, the regeneration temperature is 20-150° C.

Step S300: drying the adsorbent after the treatment of step S200 at 50-300° C. and obtaining a regenerated adsorbent. Similarly, within the range of drying temperature mentioned above, the completely volatilization of the surface regenerant as well as the valid performance of the adsorbent can be ensured. Preferably, the drying temperature is 50-120° C.

The method for oxidative regenerating saturated adsorbent provides in the present disclosure is a stable and efficient way for the completely recovery of the saturated adsorbent.

In some embodiments, the adsorbent loaded with adsorbates includes the adsorbates and the supported metal hydroxide adsorbent; the adsorbates contain sulfur compounds; a mass ratio of the adsorbates to the supported metal hydroxide adsorbent is 0.0001:1 to 0.05:1. Within this mass ratio, the oxidative regeneration method can effectively regenerate the saturated adsorbent.

In some embodiments, the supported metal hydroxide adsorbent includes a metal hydroxide and a support, and a mass ratio of the metal hydroxide to the support is 5:100 to 30:100. The oxidation regeneration method of the present invention is preferably directed to the regeneration of the supported metal hydroxide adsorbent, which can not only achieve the purpose of effective regeneration, but also ensure that the regenerated supported metal hydroxide adsorbent can still efficiently remove sulfur species from gasoline while maintaining the octane number of gasoline.

In some embodiments, the type of metal in metal hydroxide includes one or more of alkalis metal, alkaline-earth metal, copper, iron, zinc, manganese, aluminum, cerium, cobalt, nickel, chromium, titanium, vanadium, stannum. Using metal hydroxide for adsorptive desulfurization of gasoline can not only effectively adsorb and remove sulfide, but also minimize the loss of gasoline octane number.

In some embodiments, the support may be one or more of an organic support and an inorganic support. Optionally, the organic support could be one or more of activated carbon, coke, charcoal and carbon molecular sieve. Optionally, the inorganic support could be one or more of silicon dioxide, silica gel, alumina, clay, aluminium silicate, silica-alumina, titanium oxide, zirconia, zinc aluminate, zinc titanate, zinc silicate, calcium aluminate, calcium silicate, magnesium silicate, magnesium aluminate, magnesium titanate, synthetic zeolite and natural zeolite.

In some embodiments, the clay could be one or more of bleaching earth, China clay, diatomite and kaolin.

In some embodiments, the metal hydroxide could be one of zinc hydroxide, copper hydroxide, magnesium hydroxide, calcium hydroxide, cobalt hydroxide and nickel hydroxide. Using these kinds of metal hydroxides as active adsorption sites has remarkably beneficial effect on the adsorptive desulfurization performance.

In some embodiments, the metal hydroxide could be a composite of zinc hydroxide and a metal hydroxide A with a mass ratio of (5 to 15):(1 to 5). The metal hydroxide A could be one of copper hydroxide, magnesium hydroxide, calcium hydroxide, cobalt hydroxide and nickel hydroxide.

Or, the metal hydroxide could be a composite of zinc hydroxide, a metal hydroxide A and a metal hydroxide B with a mass ratio of (5 to 15):(1 to 5):(1 to 5). The metal hydroxide A could be one of copper hydroxide, magnesium hydroxide, calcium hydroxide, cobalt hydroxide and nickel hydroxide. The metal hydroxide B could be one of copper hydroxide, magnesium hydroxide, calcium hydroxide, cobalt hydroxide and nickel hydroxide. Notably, the metal hydroxide A is different from the metal hydroxide B.

Or, the metal hydroxide could be a composite of zinc hydroxide, a metal hydroxide A, a metal hydroxide B and a metal hydroxide C with a mass ratio of (5 to 15):(1 to 5):(1 to 5):(1 to 5). The metal hydroxide A could be one of copper hydroxide, magnesium hydroxide, calcium hydroxide, cobalt hydroxide and nickel hydroxide. The metal hydroxide B could be one of copper hydroxide, magnesium hydroxide, calcium hydroxide, cobalt hydroxide and nickel hydroxide. The metal hydroxide C could be one of copper hydroxide, magnesium hydroxide, calcium hydroxide, cobalt hydroxide and nickel hydroxide. Notably, the metal hydroxide A, the metal hydroxide B and the metal hydroxide C are different from each other.

The supported composites of zinc hydroxide and other metal hydroxide showed prominent performance for the removal of sulfur species from gasoline. Additionally, the synergy effect of the two or more metal hydroxide further improves the adsorption capacity for sulfur species.

The oxidative regeneration method of the present invention preferably has beneficial effect on the regeneration of the above mentioned supported metal hydroxide adsorbent.

In some embodiments, the sulfur compounds contain mercaptan. The supported metal hydroxide adsorbents disclosed in the present invention displayed excellent performance for the mercaptan removal. Besides, the supported metal hydroxide adsorbents showed stable cyclic performance for desulfurization under the treatment of the oxidative regeneration method presented in this disclosure.

In some embodiments, the oxidant could be one or more of hydrogen peroxide, oxygen, organic peroxides, ozone, sodium persulfate, ammonium persulfate and potassium persulfate. Optionally, the organic peroxides could be one or more of the hydroperoxides ($R_1OOH$), dialkyl peroxide ($R_1OOR_2$), diacyl peroxide ($R_1COOOOCR_2$), peroxyester ($R_1COOOR_2$), carbonate peroxide ($R_1OCOOOOCOR_2$) and ketone peroxide. The oxidant mentioned above can efficiently oxidize the surface adsorbates of the saturated adsorbent. For instant, the oxidant can oxidize the surface adsorbed mercaptan to a readily desorb oxidative product, thus realizing the regeneration of adsorbents.

In some embodiments, a mole ratio of the oxidant to the sulfur compounds is 0.5:1 to 50:1. Within this molar ratio range, the catalytic effect of the oxidant on the sulfur species can be achieved and optimized. Preferably, the molar ratio of the oxidant to the sulfur compounds is 1:1.

In some embodiments, the regenerant could be one or more of C1-C5 fatty alcohols, C2-C8 ethers, C3-C5 ketones, C2-C10 esters, C1-C5 halogenated hydrocarbons, C6-C8 aromatic compounds, water, water vapor, C3-C25 aliphatic hydrocarbons, C2-C4 nitriles, C1-C6 amides. Preferably, the regenerant could be one or more of n-octane, ethanol, acetonitrile, methanol and water. The oxidized adsorbate can be better dissolved in above mentioned regenerant. Besides, the regenerant above shows negligible effect on the performance of the supported metal hydroxide adsorbents.

Optionally, the optimized combination of oxidant and regenerant could be hydrogen peroxide/n-octane, cumene hydroperoxide/n-octane, hydrogen peroxide/ethanol, hydrogen peroxide/acetonitrile, hydrogen peroxide/n-butanol, hydrogen peroxide/methanol.

In some embodiments, the mass ratio of the oxidant to the saturated adsorbent is 1:1 to 100:1. Within the range of this mass ratio, the oxidant-contained regenerant shows better ability for the regeneration of saturated adsorbent. If the amount of oxidant-contained regenerant is below the above range, the adsorbed surface species is not completely oxidized, resulting in poor regeneration effect. On the other hand, if the amount of oxidant-contained regenerant is greater than the above range, there will be adverse impact on the metal hydroxide which also leads to the poor regeneration effect.

Preparation of the Supported Zinc Hydroxide Adsorbent 0.2441 g of $ZnSO_4 \cdot H_2O$ was dissolved in 5 mL of deionized water and stirred until the solution was clarified. 0.5 g of silicon dioxide was added to the solution and sonicated for 30 min. 5 wt % ammonia water was used as a precipitator and to adjust the pH of the above solution to 10. The mixture was continually stirred for 24 h at room temperature. The resultant suspension was filtered and washed with deionized water. The final product was dried at 60° C. for 6 h. A mass ratio of metal hydroxide to support is 10:100.

Adsorptive De-Mercaptan Test from Model Gasoline

Adsorption desulfurization experiments were carried out in a batch reactor setup under ambient conditions. Adsorbent was mixed with sulfur-contained model fuel in a given ratio in the reactor. The fuel-to-adsorbent (w/w) was 100. The sulfur species is heptyl mercaptan ($C_7H_{16}S$) and the initial concentration of heptyl mercaptan ($C_7H_{16}S$) in gasoline was 500 ppm. After reaching adsorption equilibrium within 2 h, the adsorbent loaded with mercaptan was separated from the treated fuel. The treated fuel was sampled and analyzed by an ultraviolet fluorescence sulfur analyzer.

Oxidative Regeneration Test of the Loaded Adsorbent

Note that, in the following examples, the mole ratio of oxidant to sulfur species is denoted as "O/S ratio", and the saturated adsorbent refers to the adsorbent loaded with mercaptan.

EXAMPLE 11

Oxidative Regeneration of Saturated Adsorbent by $H_2O_2$/N-Octane 140 mg of saturated adsorbent was filtered from the treated fuel and immersed in 10 mL of n-octane solution. 11 μl of 30% $H_2O_2$ solution was added to above suspension according to the 1:1 O/S ratio. The solution was stirred for 60 min under ambient conditions. Then, the desorbed adsorbent was filtered from the solution and washed with minor ethanol to remove the residual hydrogen peroxide. The final product was dried at 100° C. The regenerated adsorbent was used in the next adsorption-regeneration cycles.

EXAMPLE 12

Oxidative Regeneration of Saturated Adsorbent by Isopropyl Hydrogen Peroxide/N-Octane 140 mg of saturated adsorbent was filtered from the treated fuel and immersed in 10 mL of n-octane solution. 20 μl of 80% isopropyl hydrogen peroxide was added to above suspension according to the 1:1 O/S ratio. The solution was stirred for 60 min under ambient conditions. Then, the desorbed adsorbent was filtered from the solution and washed with minor ethanol to remove the residual hydrogen peroxide. The final product was dried at 100° C. The regenerated adsorbent was used in the next adsorption-regeneration cycles.

EXAMPLE 13

Oxidative Regeneration of Saturated Adsorbent by $H_2O_2$/Ethanol 140 mg of saturated adsorbent was filtered from the treated fuel and immersed in 10 mL of ethanol solution. 11 μl of 30% $H_2O_2$ was added to above suspension according to the 1:1 O/S ratio. The solution was stirred for 60 min under ambient conditions. Then, the desorbed adsorbent was filtered from the solution and washed with minor ethanol to remove the residual hydrogen peroxide. The final product was dried at 100° C. The regenerated adsorbent was used in the next adsorption-regeneration cycles.

EXAMPLE 14

Oxidative Regeneration of Saturated Adsorbent by $H_2O_2$/Acetonitrile 140 mg of saturated adsorbent was filtered from the treated fuel and immersed in 10 mL of acetonitrile solution. 11 μl of 30% $H_2O_2$ was added to above suspension according to the 1:1 O/S ratio. The solution was stirred for 60 min under ambient conditions. Then, the desorbed adsorbent was filtered from the solution and washed with minor ethanol to remove the residual hydrogen peroxide. The final product was dried at 100° C. The regenerated adsorbent was used in the next adsorption-regeneration cycles.

EXAMPLE 15

Regeneration of Saturated Adsorbent by Acetonitrile 140 mg of saturated adsorbent was filtered from the treated fuel and immersed in 10 mL of acetonitrile solution.

The solution was stirred for 60 min under ambient conditions. Then, the desorbed adsorbent was filtered from the solution and washed with minor ethanol. The final product was dried at 100° C. The regenerated adsorbent was used in the next adsorption-regeneration cycles.

EXAMPLE 16

Regeneration of Saturated Adsorbent by $H_2O_2$ Solution 140 mg of saturated adsorbent was filtered from the treated fuel and immersed in 10 mL of $1\times10^{-3}$ g/cm³ $H_2O_2$ solution. The solution was stirred for 60 min at 80° C. Then, the desorbed adsorbent was filtered from the solution and washed with deionized water. The final product was dried at 100° C. The regenerated adsorbent was used in the next adsorption-regeneration cycles.

EXAMPLE 17

Oxidative Regeneration of Saturated Adsorbent by $H_2O_2$/Methanol 140 mg of saturated adsorbent was filtered from treated fuel and immersed in 10 mL of methanol solution. 11 μl of 30% $H_2O_2$ was added to above suspension. The solution was stirred for 60 min at 50° C. Then, the desorbed adsorbent was filtered from the solution and washed with methanol. The final product was dried at 100° C. The regenerated adsorbent was used in the next adsorption-regeneration cycles.

EXAMPLE 18

Oxidative Regeneration of Saturated Adsorbent by $H_2O_2$/N-Butyl Alcohol 140 mg of saturated adsorbent was filtered from treated fuel and immersed in 10 mL of n-butyl alcohol solution. 11 μl of 30% $H_2O_2$ was added to above suspension. The solution was stirred for 60 min at 50° C. Then, the desorbed adsorbent was filtered from the solution and washed with methanol. The final product was dried at 100° C. The regenerated adsorbent was used in the next adsorption-regeneration cycles.

The results of cyclic adsorptive desulfurization performance of the supported zinc hydroxide adsorbent under different regeneration conditions are shown in Table 5. The term "removal of $C_7H_{16}S$(%)" refers to the mass ratio of the residual concentration of mercaptan in the treated fuel to the initial concentration of mercaptan in the fresh fuel. The cycle number refers to the times of the adsorbent regeneration. For example, cycle number of 0 indicates the fresh adsorbent is used for adsorptive desulfurization test; cycle number of 1 indicates the adsorbent which regenerated 1 time by the oxidative regeneration method is used for the adsorptive desulfurization test; cycle number of 2 indicates the adsorbent which regenerated 2 times by the oxidative regeneration method is used for the adsorptive desulfurization test.

TABLE 5

| | | Removal of $C_7H_{16}S$ (%) | | | | | |
|---|---|---|---|---|---|---|---|
| Number | Example | 0 | 1 | 2 | 3 | 4 | 5 |
| 1 | 11 | 52 | 44 | | | | |
| 2 | 12 | 52 | 35 | 29 | 36 | | |
| 3 | 13 | 52 | 47 | 40 | 37 | | |
| 4 | 14 | 52 | 49 | 46 | 50 | 40 | 44 |
| 5 | 15 | 52 | 27 | 33 | | | |
| 6 | 16 | 52 | 48 | 51 | 55 | | |
| 7 | 17 | 52 | 55 | 58 | 56 | | |
| 8 | 18 | 52 | 49 | 54 | 56 | | |

Except the Example 15, other examples showed stable desulfurization performance in the cyclic adsorption test, as shown in Table 5. Specifically, Example 14 still exhibited excellent desulfurization performance after 5 cycles. In the Example 16-18, the desulfurization performance of the regenerated adsorbents is better than that of the fresh adsorbent. Notably, Example 17 displayed the best regeneration effect with the desulfurization performance of the adsorbent was almost unchanged. The adsorption capacity of the adsorbent regenerated by the method of Example 15 decreased significantly, indicating the inefficiency of the sole solution washing.

Comparative Examples

Comparative Examples were set based on Example 17, and the effect of oxidative regeneration was detected. Note that the regeneration temperature is denoted as "$T_{reg.}$", and the drying temperature is denoted as "$T_{dry}$"

TABLE 6

| Cyclic ADS performance of supported zinc hydroxide adsorbent regenerated under different O/S ratio | | | |
|---|---|---|---|
| Number | Example | O/S ratio | Removal of $C_7H_{16}S$ (%) |
| 1 | Example 17 | 1:1 | 55 |
| 2 | Comparative Example 1 | 20:1 | 50 |
| 3 | Comparative Example 2 | 50:1 | 51 |
| 4 | Comparative Example 3 | 80:1 | 36 |
| 5 | Comparative Example 4 | 0.4:1 | 34 |
| 6 | Comparative Example 5 | 100:1 | 29 |
| 7 | Comparative Example 6 | 0.01:1 | 15 |
| 8 | Comparative Example 7 | 0.1:1 | 25 |

Regeneration conditions of Comparative Example 1-7 are similar to that of Example 17, except for the O/S ratio. Example 17 and Comparative Example 1-2 displayed better cyclic ADS performance, while the O/S ratio of Comparative Example 3-7 leads to decreased ADS performance.

TABLE 7

Cyclic ADS performance of supported zinc hydroxide adsorbent regenerated under different mass ratio of oxidant-contained regenerant to adsorbent

| Number | Example | Mass ratio of oxidant-contained regenerant to adsorbent | Removal of $C_7H_{16}S$ (%) |
|---|---|---|---|
| 1 | Example 17 | 71:1 | 55 |
| 2 | Comparative Example 8 | 100:1 | 56 |
| 3 | Comparative Example 9 | 120:1 | 56 |
| 4 | Comparative Example 10 | 30:1 | 46 |
| 5 | Comparative Example 11 | 1:1 | 30 |
| 6 | Comparative Example 12 | 0.5:1 | 20 |
| 7 | Comparative Example 13 | 0.1:1 | 16 |

Regeneration conditions of Comparative Example 8-13 are similar to that of Example 17, except for the mass ratio of oxidant-contained regenerant to adsorbent. As shown in Table 7, the cyclic ADS performance of Example 17 and Comparative Example 8-10 were comparable to that of the fresh adsorbents, implying that the saturated adsorbent were completely regenerated under these conditions. However, further improvement on the mass ratio above 100 did not show significant effect on the cyclic ADS performance. On the contrary, the low mass ratio of oxidant-contained regenerant to adsorbent as shown in Comparative Example 11-13 resulted in poor regeneration effect and decreased ADS performance compared.

TABLE 8

Cyclic ADS performance of supported zinc hydroxide adsorbent regenerated under different regeneration temperature and drying temperature

| Number | Example | $T_{reg.}$ | $T_{dry}$ | Removal of $C_7H_{16}S$ (%) |
|---|---|---|---|---|
| 1 | Example 16 | 80 | 100 | 52 |
| 2 | Comparative Example 15 | 80 | 110 | 50 |
| 3 | Comparative Example 16 | 80 | 200 | 48 |
| 4 | Comparative Example 17 | 80 | 300 | 40 |
| 5 | Comparative Example 18 | 80 | 350 | 26 |
| 6 | Comparative Example 19 | 80 | 45 | 35 |
| 7 | Comparative Example 20 | 80 | 40 | 32 |
| 8 | Comparative Example 21 | 150 | 100 | 51 |
| 9 | Comparative Example 22 | 180 | 100 | 48 |
| 10 | Comparative Example 23 | 270 | 100 | 26 |
| 11 | Comparative Example 24 | 300 | 100 | 15 |
| 12 | Comparative Example 25 | 10 | 100 | 34 |

Regeneration conditions of Comparative Example 15-20 are similar to that of Example 16, except for the drying temperature. As shown in Example 18-20, high drying temperature had adverse impact on the recovery of the adsorbent performance, leading to the decreased desulfurization performance. Regeneration conditions of Comparative Example 21-25 are similar to that of Example 16, except for the regeneration temperature. It is obviously that the regenerated performance of Comparative Example 23-25 was not ideal.

What is claimed is:

1. A supported metal hydroxide adsorbent for ultra-deep desulfurization of gasoline, wherein the supported metal hydroxide adsorbent comprises a support and a metal hydroxide loaded on the support, and a mass ratio of the metal hydroxide to the support is 5:100 to 30:100, wherein the metal hydroxide is a composite of zinc hydroxide and a metal hydroxide A, with a mass ratio of zinc hydroxide to the metal hydroxide A of (5 to 15):(1 to 5); the metal hydroxide A is one of copper hydroxide, magnesium hydroxide, calcium hydroxide, cobalt hydroxide and nickel hydroxide;

or the metal hydroxide is a composite of zinc hydroxide, a metal hydroxide A and a metal hydroxide B, with a mass ratio of zinc hydroxide to the metal hydroxide A to the metal hydroxide B of (5 to 15):(1 to 5):(1 to 5); the metal hydroxide A is one of copper hydroxide, magnesium hydroxide, calcium hydroxide, cobalt hydroxide and nickel hydroxide; the metal hydroxide B is one of copper hydroxide, magnesium hydroxide, calcium hydroxide, cobalt hydroxide and nickel hydroxide; and the metal hydroxide A is different from the metal hydroxide B;

or the metal hydroxide is a composite of zinc hydroxide, a metal hydroxide A, a metal hydroxide B and a metal hydroxide C with a mass ratio of zinc hydroxide to the metal hydroxide A to the metal hydroxide B to the metal hydroxide C of (5 to 15):(1 to 5):(1 to 5):(1 to 5); the metal hydroxide A is one of copper hydroxide, magnesium hydroxide, calcium hydroxide, cobalt hydroxide and nickel hydroxide; the metal hydroxide B is one of copper hydroxide, magnesium hydroxide, calcium hydroxide, cobalt hydroxide and nickel hydroxide; the metal hydroxide C is one of copper hydroxide, magnesium hydroxide, calcium hydroxide, cobalt hydroxide and nickel hydroxide; and the metal hydroxide A, the metal hydroxide B and the metal hydroxide C are different from each other.

2. The supported metal hydroxide adsorbent for ultra-deep desulfurization of gasoline according to claim 1, wherein the support is one or more of an organic support and an inorganic support; the organic support comprises one or more of activated carbon, coke, charcoal and carbon molecular sieve; the inorganic support comprises one or more of silicon dioxide, silica gel, alumina, clay, aluminium silicate, silica-alumina, titanium oxide, zirconia, zinc aluminate, zinc titanate, zinc silicate, calcium aluminate, calcium silicate, magnesium silicate, magnesium aluminate, magnesium titanate, synthetic zeolite and natural zeolite.

3. A method for oxidative regenerating a supported metal hydroxide adsorbent after adsorptive desulfurization of gasoline, comprising the steps of:

step (1) after the supported metal hydroxide adsorbent reaching adsorption equilibrium in the adsorptive desulfurization of gasoline, separating the supported metal hydroxide adsorbent from gasoline and obtaining the supported metal hydroxide adsorbent loaded with adsorbates; wherein the gasoline contains sulfur compounds;

step (2) immersing and washing the supported metal hydroxide adsorbent loaded with adsorbates in an oxidant-contained regenerant at 20-250° C.; and step (3) drying the supported metal hydroxide adsorbent loaded with adsorbates after the treatment of step 2 at 50-300° C. and obtaining a regenerated supported metal hydroxide adsorbent.

4. The method according to claim 3, wherein the supported metal hydroxide adsorbent loaded with adsorbates comprises the adsorbates and the supported metal hydroxide adsorbent; the adsorbates comprise sulfur compounds; a mass ratio of the adsorbates to the supported metal hydroxide adsorbent is 0.0001:1 to 0.05:1.

5. The method according to claim 4, wherein the supported metal hydroxide adsorbent comprises a support and a metal hydroxide loaded on the support, and a mass ratio of the metal hydroxide to the support is 5:100 to 30:100.

6. The method according to claim 4, wherein the sulfur compound comprises mercaptan.

7. The method according to claim 4, wherein a mole ratio of the oxidant of the oxidant-contained regenerant to the sulfur compounds is 0.5:1 to 50:1.

8. The method according to claim 3, wherein an oxidant of the oxidant-contained regenerant comprises one or more of hydrogen peroxide, oxygen, organic peroxides, ozone, sodium persulfate, ammonium persulfate and potassium persulfate.

9. The method according to claim 3, wherein the oxidant-contained regenerant comprises one or more of C1-C5 small-molecular fatty alcohols, C2-C8 ethers, C3-C5 ketones, C2-C10 esters, C1-C5 halogenated hydrocarbons, C6-C8 aromatic compounds, water, water vapor, C3-C25 aliphatic hydrocarbons, C2-C4 nitriles, C1-C6 amides.

10. The method according to claim 3, wherein a mass ratio of the oxidant-contained regenerant to the supported metal hydroxide adsorbent loaded with adsorbates is 1:1 to 100:1.

11. The method according to claim 3, wherein temperature of the immersing and washing is 20-150° C.

12. The method according to claim 3, wherein temperature of the drying is 50-120° C.

* * * * *